(12) United States Patent
Jansen et al.

(10) Patent No.: US 7,709,977 B2
(45) Date of Patent: May 4, 2010

(54) METHOD AND ARRANGEMENT FOR CONTROLLING A SWITCHING CONNECTION BETWEEN THE ELECTRICAL OUTPUTS OF A FUEL CELL AND AN ISOLATED ELECTRICAL NETWORK

(75) Inventors: Axel Jansen, Neidlingen (DE); Josef Sonntag, Kirchheim (DE); Hubert Urban, Ohmden (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 11/207,570

(22) Filed: Aug. 18, 2005

(65) Prior Publication Data

US 2006/0055246 A1 Mar. 16, 2006

Related U.S. Application Data

(63) Continuation of application No. 10/110,899, filed as application No. PCT/EP00/09980 on Oct. 11, 2000, now abandoned.

(30) Foreign Application Priority Data

Oct. 18, 1999 (DE) ................................ 199 50 008

(51) Int. Cl.
*H02J 1/00* (2006.01)
*H01H 35/00* (2006.01)
*H02H 3/00* (2006.01)
*H01H 83/00* (2006.01)
*H01H 47/00* (2006.01)

(52) U.S. Cl. .......................... 307/87; 307/130; 307/131
(58) Field of Classification Search ................... 307/87, 307/130, 131
See application file for complete search history.

(56) References Cited

U.S. PATENT DOCUMENTS

| 4,962,462 | A | * | 10/1990 | Fekete ......................... 700/297 |
| 5,789,092 | A | * | 8/1998 | Spiers et al. .................. 429/24 |
| 6,083,637 | A | * | 7/2000 | Walz et al. .................... 429/17 |
| 6,158,537 | A | * | 12/2000 | Nonobe ..................... 180/65.3 |
| 6,264,337 | B1 | * | 7/2001 | Rannells et al. ............. 359/843 |
| 6,380,638 | B1 | * | 4/2002 | Bitsche et al. ............ 290/40 C |

FOREIGN PATENT DOCUMENTS

DE 4341437 C1 * 1/1995
WO WO 99 46140 A * 9/1999

OTHER PUBLICATIONS

English Language Translation for DE 4341437 C1 Jan. 1995 Germany Hurich et al.*

* cited by examiner

*Primary Examiner*—Jared J Fureman
*Assistant Examiner*—Dru M Parries
(74) *Attorney, Agent, or Firm*—Crowell & Moring LLP

(57) ABSTRACT

The invention relates to a method and apparatus for controlling and for setting the switching states of switches which are connected to the electrical poles or outputs of a fuel cell and which are followed by a network, which is fed from the fuel cell, and has loads. The invention is preferably suitable for use in a vehicle. The switches are opened if the fuel cell and/or the vehicle assume critical states.

25 Claims, 1 Drawing Sheet

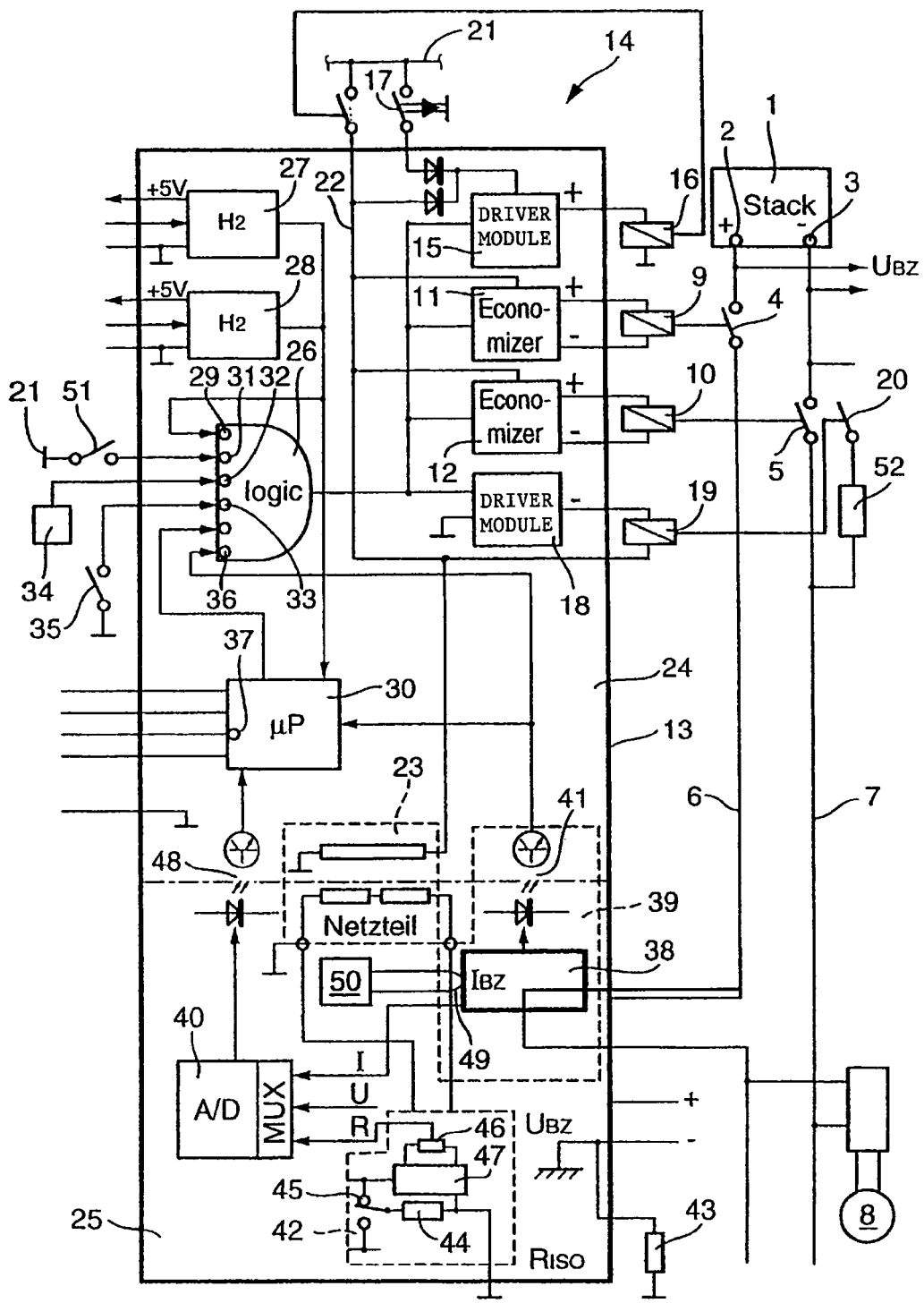

METHOD AND ARRANGEMENT FOR CONTROLLING A SWITCHING CONNECTION BETWEEN THE ELECTRICAL OUTPUTS OF A FUEL CELL AND AN ISOLATED ELECTRICAL NETWORK

CROSS-REFERENCES TO RELATED APPLICATIONS

This application is a continuation of U.S. patent application Ser. No. 10/110,899 filed August 2002.

BACKGROUND AND SUMMARY OF THE INVENTION

This application claims the priority of German patent document 199 50 008.8, filed Oct. 18, 1999 and PCT International Application No. PCT/EP00/09980, filed Oct. 11, 2000, the disclosure of which is expressly incorporated by reference herein.

The invention relates to a method and apparatus for controlling and for setting the switching state of a switching connection between the electrical outputs or poles of a fuel cell and an electrically isolated network which is arranged in the apparatus, and which supplies power from the fuel cell to loads that connect therewith. A further network is provided in the apparatus, whose voltage is lower than that of the network which can be connected to the fuel cell and that of electrical loads as well as that of a storage battery.

Mobile power generating systems (with fuel cells, in particular) often have two electrical networks. The network which is fed from the fuel cell is not grounded, is electrically isolated, and contains, for example, one or more drive motors for the mobile apparatus. A range of auxiliary units are required for starting and operation of the fuel cell, and their drive motors are supplied with power from a rechargeable battery while the fuel cell is being started. The rechargeable battery is arranged in a low-voltage network, and supplies the drive motors of the auxiliary units (which are arranged in a high-voltage network) with electrical power via a DC/DC converter. During operation of the fuel cell, the battery can be charged via the converter arranged between the two networks. The converter, which provides DC isolation between the two networks, feeds the loads which are connected to the low-voltage network, even during operation of the fuel cell. At least in vehicles, one pole of the low-voltage network is generally connected to the vehicle ground.

In order to avoid any danger to personnel or to parts of the mobile device resulting from current from the fuel cell, the switching connection at the output of the fuel cell either must not be closed, or must at least be opened in certain situations or when certain events occur. For example, in the case of fuel cells which are operated with hydrogen, the fuel cell system must be checked for uncontrolled escape of hydrogen before and during operation. In order to prevent a defect in the fuel cell, it is necessary to ensure that the high-voltage network is not connected to the fuel cell until it has reached operational readiness, and is quickly disconnected from it if an unacceptably large amount of current is drawn, for example in the event of a short circuit, or if the output voltage is too low. A minimum isolation resistance between the two networks must also always be maintained, for safety reasons.

The invention is therefore directed to a method and apparatus for use in a power supply system, which has a fuel cell with a switching connection for an electrically isolated network containing electrical loads and has a further network designed for a lower voltage than the fuel cell voltage, with further electrical loads. According to the invention, the switching connection between the outputs of the fuel cells and the network can either not be closed, or can be opened quickly in certain situations or certain operating states in which a conductive connection between the electrical outputs of the fuel cell and the electrically isolated network can endanger personnel, or endanger parts of the apparatus or the fuel cell itself.

This and other objects and advantages are achieved by the method and apparatus according to the invention, in which sensors arranged in or on the apparatus are used to detect and signal the existence of certain "apparatus states" in which the supply of power to the electrically isolated network must be precluded or stopped for safety reasons. The sensors are monitored by a control and evaluation unit that is supplied with power from the network. The switching connection has at least one switching or operating contact of a switching member connected to each output or pole of the fuel cell, in order to disconnect the electrically isolated network from the outputs or poles of the fuel cell that are electrically isolated from the conductive parts of the apparatus. The switching or operating contacts which are connected to the poles or outputs are part of one switching member (or of separate switching members connected to the switching and control unit). The energy for closing the switching or operating contacts during starting of the fuel cell is released to the switching member or members by the switching and control unit once the fuel cell has reached operational readiness, provided the switching and control unit does not detect any sensor signal indicating that closure of the switching or operating contacts is not permissible for safety reasons. Upon detection of a sensor signal indicating that closure of the switching or operating contacts is not permissible for safety reasons, the control and evaluation unit blocks or interrupts the power supply to the switching member or members.

The method according to the invention achieves a high degree of operational reliability for the fuel cell system. It is thus possible to prevent danger to personnel and to the environment as well as to parts of the apparatus itself. In the event of short circuits in the electrically isolated network, or in the loads fed from this network, the power supply to the switching member members fails, so that the switching or operating contacts open automatically. When a danger or defect is signalled, the fuel cell system changes to a state in which the output power from the fuel cell is interrupted, that is to say a safe operating state is reached.

The series circuit formed by a resistor and a switching or operating contact of a further switching member (which is connected to the switching and control unit and can be operated separately from the other switching members) is preferably connected in parallel with one of the switching or operating contacts which are connected to the outputs or poles of the fuel cell. Energy for closing the switching or operating contact of the further switching member is supplied at the same time as the energy for closing the switching or operating contact of the switching member after the starting of the fuel cell and after it has reached operational readiness. If the switching and control unit detects a signal which indicates that closure of the switching or operating contacts of the switching members is not permissible, power for operating the further switching member and the other switching members is blocked or interrupted. The method described above results in an initial charge between the fuel cell outputs and the electrically isolated network. The potentials on both sides of the switching member contacts are matched by closing the initial charging path, which contains the resistor, in order to largely avoid generating sparks when the contacts are closed.

In one preferred embodiment, the emergence of hydrogen from the hydrogen-producing or hydrogen-storing units is monitored by means of gas sensors. A sensor which is connected downstream from the fuel cell monitors whether the load current from the fuel cell has overshot or undershot limit values, and at least one crash sensor monitors whether the mobile apparatus has impacted with an obstruction. The isolation resistance of the electrically isolated network from the mobile apparatus earth is monitored. In addition, the output voltage of the fuel cell is monitored to determine whether limit values are overshot or undershot. Furthermore, the closure state of doors and covers is monitored by switches, and the supply voltage of the further network is monitored for limit values being overshot and undershot. Finally, the presence of conditions for the opening of the switching or operating contacts of the switching members is checked.

In particular, the isolation resistance between the electrically isolated network and the mobile apparatus ground is determined by means of a pulse measurement method, with alternate positive and negative pulses being passed to ground via a measurement resistor of predetermined magnitude. The pulses cause a current to flow via the isolation resistances to a reference point in the network; and the latter current is measured by means of the voltage drop across the measurement resistor. The measurement voltage is supplied to an A/D converter via a high-pass filter and a low-pass filter. The isolation resistance is monitored to detect any overshooting of a lower threshold (which can be predetermined) or of an excessively high threshold. The isolation measurement is carried out continuously during operation of the mobile device while, during starting, it is carried out as a quick measurement with reduced accuracy. If the isolation resistance is too low, the ungrounded network is disconnected from the fuel cell.

In another expedient embodiment, the current measurement device is monitored by feeding a test current into an additional winding of the current sensor, which contains a current transformer.

For safety reasons, in one preferred embodiment, when one or more of the gas sensors responds, the contacts of the switching connection between the outputs or poles of the fuel cell and the electrically isolated network, as well as at least one contact of an additional switching member in the further network are opened in order to interrupt the power supply at least to the switching and control unit.

In the apparatus according to the invention, the outputs or poles of the fuel cell are each connected via at least one switching or operating contact to the electrically isolated network. A control and evaluation unit of an assembly has a processor which is connected to an internal bus of the mobile apparatus, a logic circuit with logic functions in the form of hardware, an A/D converter (which is connected to the processor in a DC-isolating manner and which is connected at its input to analog sensors for the current and voltage of the fuel cell and to a measurement device for the isolation resistance between the electrically isolated network and the mobile apparatus earth), a sensor for fuel cell current which is connected to the processor and the logic circuit in a DC-isolated manner, and a power supply unit, which is fed from the further network, with DC isolation for supplying an operating voltage to the A/D convertor. Control modules are connected to the output of the logic circuit and converters that are connected to the processor and to the logic circuit, for supplying an operating voltage to the hydrogen sensors, and for matching signals which are emitted from these sensors to the levels of the logic circuit and of the processor.

The logic module, the processor, the converters and the control modules are supplied with an operating voltage from the further network. At least one output of the processor (30) is connected to a corresponding input of the logic circuit, which logic circuit is connected to sensors for producing signals relating to operating states of the mobile apparatus or its modules. The enabling of output signals from the control modules can be controlled by means of (or via) the logic circuit, which is controlled by a higher-level appliance and is connected to the respective one coil of a first switching member which has one of the two contacts and of a second switching member which has the other switching contact. For current, voltage and/or isolation resistance measured values which are detected by the processor, and for sensor measured values which are detected by the logic circuit for which the supply to the electrically isolated network must be precluded or stopped for safety reasons, the output of output signals from the control modules to the coils is blocked or interrupted.

The assembly according to the invention provides a compact controller of relatively low weight and with small dimensions for a mobile fuel cell system, by means of which numerous safety requirements can be satisfied during operation of the fuel cell system. The signals which are processed by the logic circuit relating to critical states of the fuel cell system or of the mobile device cause the switching contacts to be opened immediately.

A further switching or operating contact of a third switching member in series with a resistor is preferably arranged in parallel with the contact of the second or first switching member, and the third switching member is connected to a driver module that is supplied with an operating voltage from the further network on the assembly. The driver module is connected to the logic circuit such that, in the start phase after the fuel cell has reached operational readiness (before the emission of a control signal to the one control module, which operates the second or first switching member), the logic circuit applies a control signal to the driver module to emit an operating signal to the third switching member at the same time as the emission of a control signal for operating the first or second switching member. It also blocks the emission of control signals to operate the three switching members, in order to disconnect the outputs of the fuel cell from the electrically isolated network. The method described above results in an initial charge between the fuel cell outputs and the electrically isolated network. The initial charge causes the potentials on both sides of the contact poles to be matched to one another, thus largely avoiding the generation of sparks during switching. This protects the contacts.

When the gas sensors respond, it is also advantageous to disconnect not only the switching connection between the fuel cell and the electrically isolated network, but also the connection for the further network to the rechargeable battery. For this purpose, a further driver module, which receives the operating voltage from the further network on the assembly is connected to the output of the logic circuit, and a system relay is operated, which can be disconnected together with the switching members when at least one gas sensors responds, in order to interrupt the power supply from the further network at least for that assembly.

In one preferred embodiment, the assembly has a printed circuit board with a first section fitted with those components that are supplied with an operating voltage from the further network (such as the logic circuit, the processor, the converter and control and driver modules with associated conductor tracks) and the connections for the coils of the switching members and the connections for sensors that are supplied with the voltage of the further network, for bus conductors and for the earth connection. This first section is separated from a further section of the printed circuit board, which is fitted with those components to which the voltage of the fuel cell or the isolated electrical network is applied (such as the current sensor, a voltage divider for measuring the voltage and the associated conductor tracks as well as connections for the network fed by the fuel cell). The separation (which is formed by the two sections) of those components and conductor tracks which carry low voltages from those components and conductor tracks which carry high voltages results in a high level of safety with regard to short circuits between the two networks on the printed circuit board.

In one expedient embodiment, the negative side of the fuel cell voltage provides the reference potential for those components on the assembly to which the voltage of the fuel cell is applied; it is connected to one connection of the second section of the assembly. This reference potential allows major circuit simplification. The current sensor preferably has a current transformer with a conductor that passes through the printed circuit board and through a current transformer core arranged on the printed circuit board (without touching them). The current is measured using the compensation principle.

In particular, the current transformer is fitted with an additional winding, which is connected to a device for feeding in a defined current and is used to monitor the current measurement for functionality. Upper and lower limit values for the fuel cell current are stored in the processor. An appropriate signal is emitted to the bus, and the switching or operating contacts downstream from the poles or outputs of the fuel cell are opened if the upper limit value is exceeded, or if the lower limit is undershot.

A measurement resistor is preferably in the second section of the printed circuit board for measuring the isolation resistance of the isolated electrical network from the ground of the mobile device. Positive and negative voltage pulses applied to the measurement resistor cause a current flow, which in turn causes a voltage across the measurement resistor. The latter voltage is supplied via a high-pass filter and a low-pass filter to the A/D converter, whose output signals are supplied to the processor. The high-pass filter blocks the fuel cell DC voltage, and the low-pass filter screens out radio-frequency interference. After a specific waiting time, the processor processes the measured values for determining the isolation resistance, in order to avoid transferring any measured values during transient oscillation processes.

The processor, together with its software, is preferably monitored by a watchdog module. Thus, a processor module defect or a software crash causes the contacts at the output of the fuel cell to open, so that the initial charging path is also disconnected.

Expediently, the bus is also checked continuously for correct operation. It is advantageous for the supply voltage for the further network to be detected by means of an A/D converter, for example by means of an appropriate input to the processor, and to be monitored against predetermined limit values. If these limit values are overshot or undershot, the signal for opening the make or switching contacts is passed from the processor to the logic circuit.

In one particularly expedient embodiment, the inputs and outputs of the components arranged on the printed circuit board (such as the logic circuit, processor, control and driver stages and converter) are designed to be resistant to short circuits, resulting in a high level of operational safety.

In particular earth shorts and short circuits are detected as faults.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing is a block diagram of an arrangement for controlling the switching states of a switch connection between the electrical outputs of a fuel cell in a vehicle, and an electrically isolated network in the vehicle.

DETAILED DESCRIPTION OF THE DRAWINGS

As shown in the FIGURE, a fuel cell 1 in a vehicle (not shown) is part of a fuel cell system (also not shown in any more detail). Its respective electrical poles or outputs 2, 3 are connected to switching or operating contacts 4, 5 of at least one switching member. The fuel cell 1 is, in particular, a PEM cell, which is composed of a large number of individual modules, and the fuel cell system contains a reservoir for hydrogen or a device for producing hydrogen from a hydrocarbon, and auxiliary units for feeding and compressing hydrogen and air.

The positive and negative poles 2, 3 are electrically isolated from one another and from the conductive parts of the vehicle. A line 6 is connected to the contact 4, and a line 7 is connected to the contact 5. The lines 6, 7 are components of an electrically isolated or floating network, which contains a number of loads which are fed from the fuel cell 1. One major load is a traction motor 8 connected to the network via an inverter. Further loads (for example a DC/DC converter for producing a charging current for a rechargeable battery, in a further network arranged in the vehicle) are not shown in the drawing.

The contact 4 is a part of a first switching member 9 which is arranged in the vehicle and may be a switch disconnector, a circuit breaker or a contactor 9 or relay. The contact 5 is a part of a second switching member 10, which is arranged in the vehicle and may likewise be a circuit breaker, switch disconnector, contactor or relay. (The contacts 4 and 5 are not parts of a single switch, for safety reasons.) Since the contacts 4, 5 must open when the fuel cell system or the vehicle is in critical states, the arrangement of two contacts which can be operated independently of one another provides a greater level of safety to ensure that at least one contact will operate if the other is defective, disconnecting at least one pole of the network.

The coils of the switches or contactors 9, 10 or relays are each connected to outputs of a control module in the form of economizers 11, 12. The two economizers 11, 12, which are arranged on a printed circuit board 13 in an assembly 14 and are part of a control and evaluation unit (which will be explained in more detail in the following text), produce a higher current for operating (that is, pulling-in) DC contactors or relays followed by a lower holding current for holding them. A relay driver module 15, to which a relay 16 outside the assembly 14 is connected, is also located on the printed circuit board 13 in the assembly 14. The driver module 15 has two inputs, one of which is connected via a diode to one contact 17 of a key-operated switch for starting the vehicle. When the key-operated switch is closed, a voltage from a further network in the vehicle is applied to one input of the driver module 15. The further network represented by reference numeral 21 in the drawing) is in the form of a conventional vehicle power supply network and contains a rechargeable battery with a voltage of, for example, 12 V. Loads in this further network (whose voltage is lower than that of the network which can be connected to the fuel cell 1) are, for example, windshield wiper motors, fans, window drive motors, lamps, indicator lights, etc. The further network is also referred to in the following text as the low-voltage network, with the network which is fed from the fuel cell 1 being referred to as the high-voltage network. The relay 16, which is also referred to as the system relay, supplies an operating voltage to electronic components in the assembly 14, once it has pulled in.

A further driver module 18 is also located on the printed circuit board 13 in the assembly 14. This further driver module 18 has two inputs and a third switching member 19, for example a relay 19 which may likewise be arranged in the assembly 14, is connected to its output. One contact 20 in the relay 19 is connected in series with a resistor 52. The series circuit formed by the contact 20 and the non-reactive resistor 52 is connected in parallel with the contact 5 but can also, optionally, be arranged in parallel with the contact 4. The path comprising the contact 20 and the resistor 52 is intended to be used as an initial charging circuit for matching the voltage on the fuel cell side, when there is no load on it, to the electrically isolated network side, when the DC/DC converter is connected to the rechargeable battery. The connections for the operating power supply for the economizer 11, 12 are connected to the conductor track 22, which is connected to the network 21. The connection for the operating power supply for the driver stage 15 is connected to the conductor track 22 via a diode (not shown in any more detail). In addition, one connection of a power supply unit 23 is connected to the conductor track 22. The second connection of the power supply unit 23 is connected to the vehicle ground. The power supply unit 23 is in the form of a DC/DC converter, whose input and output voltages are DC-isolated, as indicated by the transformer symbol in the drawing. The power supply unit produces a voltage (for example 15 V) that is higher than that of the operating voltage of the vehicle power supply network 21 (for example, 12V).

With reference to the operating voltage and the voltage levels of the components arranged on it, the printed circuit board 14 is subdivided into two sections 24, 25, thus physically separating the components at different voltage levels, as represented by a dashed-dotted line in the drawing. This achieves a high level of safety with regard to short circuits between components and lines or conductor tracks at different voltage levels.

A logic circuit 26 is located in the section 24, which is associated with a low voltage level, and has a number of inputs, whose connection to components will be described in more detail in the following text. On the output side, the logic circuit is connected to control inputs of the economizers 11, 12 and of the driver modules 15 and 18.

The fuel cell system contains hydrogen gas sensors in order to monitor the fuel. These gas sensors require operating voltages which are not the same as the voltage of the vehicle power supply network 21. In general, the operating voltage is less than the vehicle power supply network voltage. The signals produced by the gas sensors are at least not at the same voltage level as the vehicle power supply network or in the range of the input signals which can be processed by the logic circuit 26. Analog converter and matching circuits 27, 28 are thus provided on the printed circuit board 13. The converter and matching circuits 27, 28 each have outputs (not shown in detail), to which the operating voltage connections of gas sensors (not shown) are connected. Furthermore, the converter and output circuits 27, 28 each have two inputs (not shown in detail) for the analog signals emitted from the gas sensors.

The outputs of the converter and matching circuits 27, 28 are connected to one input 29 of the logic circuit 26 and one input of a processor 30 (preferably a microprocessor). This processor input may be an analog input with a downstream A/D converter. In contrast the input 29 of the logic circuit 26 is designed for threshold value detection. (That is, the output signals for the converter and matching circuits 27, 28 are processed further by the logic circuit 26 only if they are above a certain level.)

The converter and matching circuits 27, 28, the logic circuit 26 and the processor 30 are arranged in the section 24, together with their corresponding connections on the printed circuit board 14 for external components and the conductor tracks between the connections and the inputs of these components. The logic circuit 26 has further inputs, which are represented symbolically by the number 31. Switching contacts (for example a switching contact 51) are connected to these inputs 31. These switching contacts are used to monitor whether the devices in or on the vehicle are in the closed state. By way of example, the switching contact 51, which is supplied with voltage from the vehicle power supply network 21, is intended for monitoring the vehicle trunk lid. Further inputs to the logic circuit 26, which are jointly annotated by the number 32 and the drawing, are connected in particular to sensors which detect and signal vehicle collisions. One such sensor is shown in the drawing, and is designated by reference numeral 34. A further input 33 of the logic circuit 26 is connected to an emergency off switch 35. At least one input 36 of the logic circuit 26 is connected to a corresponding output of the processor 30.

The processor 30 has inputs which are not shown in any detail but are connected to a bus, to which other vehicle subscribers are also connected. The bus is preferably the CAN bus, which is known per se. One serial interface 37 of the processor 30 can be connected to corresponding transmission units. Furthermore, the processor 30 has a BOOT input, which is not shown in detail. The reference potential for the components which are arranged on the section 24 is the earth potential of the vehicle.

Located on the section 25 is a current transformer 38, (a straight-through current transformer), with the electrical conductor 6 being passed through it and through an opening (which corresponds to the core opening) in the printed circuit board 13, without touching them. The current transformer 38 is part of a current sensor 39, which uses the known compensation principle to measure the fuel cell current. The current sensor 39 is connected to an A/D converter 40, for example via a multiplexer which is not shown in detail. Furthermore, at its output, the current sensor 39 has an optocoupler 41, whose output is connected firstly to one input of the processor 30 and secondly to one input of the logic circuit 26. The A/D converter 40 is connected to one input, for example via the multiplexer, and is connected to the output 3 via a line (not shown).

Located in the section 25 is a device 42 for measuring the isolation resistance between the electrically isolated network and vehicle ground. The isolation resistance is represented by dashed lines in the drawing, and is represented by reference numeral 43. The reference potential for the components which are arranged in the section 25 is the potential at the negative output 3 of the fuel cell. The isolation resistance 43 is measured using a pulse method. For this purpose, the device 42 contains a measurement resistor 44, whose value is preset. Positive and negative pulses, produced by the power supply unit 23 connected to the reference voltage connection of the fuel cell, are supplied alternately to the measurement resistor 44, via a switch 45. The voltage pulses cause a current to flow from the measurement resistor 44 to the vehicle chassis, via the isolation resistance 43, back to the reference point of the fuel cell voltage, thus producing a voltage drop across the measurement resistor 44. The voltage which is produced across the measurement resistor 44 is supplied via a high-pass filter (which blocks the fuel cell DC voltage), a low-pass filter (which screens out the radio-frequency interference) and a voltage divider 46 to the A/D converter 40. (The high-pass and low-pass filters are represented collectively by reference number 47.) The output of the A/D converter 40 is connected via an optocoupler 48 to one input of the processor 30. The devices for measuring and detecting electrical or mechanical variables and states of the mobile apparatus are also referred to as sensors.

During the isolation measurement, the processor 30 handles a range of measured values of the voltage across the measurement resistor 44 only after a specific waiting time, which is matched to the transit oscillation time of the measurement system. It averages the measured values in order to minimize low-frequency interference, and then calculates the isolation resistance. During vehicle operation, the isolation resistance of the floating network of the fuel cell 1 is measured continuously, and if the degree of isolation deteriorates to an unacceptable extent, the processor 30 uses the logic circuit 26 to open the contacts 4, 5, 20 of the switching members.

The current transformer 38 has an additional winding 49 into which a current source 50 feeds a defined current in order to check the serviceability of the current transformer and of the optocoupler 41, including the conductor tracks, as far as the processor 30.

The processor 30 carries out automatic offset trimming for the analog measured values such as the fuel cell voltage, fuel cell current and isolation resistance, and monitors these values by comparing them with values which can be preset. Furthermore, the processor 30 emits these values to the bus, so that they are available to other bus subscribers in the vehicle. If critical values are overshot or undershot, the processor 30 emits an appropriate signal to the logic circuit 26.

The logic circuit 26 has logic functions, in the form of hardware, of a combinational and sequential nature and, if possible, memory functions, thus ensuring that the input signals are processed quickly. This means that, in critical situations in and on the vehicle, or in the event of dangers to the vehicle occupants, which are signalled by the gas sensors, the switching contact 51, the sensors 34 and the emergency off switch 35, the logic circuit 26 very quickly processes and passes on the appropriate messages, and causes the switching contacts 4, 5, 20 to be opened, via the economizers 11, 12 and the initial charge 18. The high-voltage network with the loads connected to it thus has the voltage removed from it, so that no more danger, in terms of hazardous voltages, can originate from it. Furthermore, a switch in the 12 V network is operated via the relay 16.

When the key-operated switch 17 has been operated, those components which are arranged on the low-voltage side of the assembly 14, such as the microprocessor 30, the logic circuit 26 and the converter and matching circuits, first have an operating voltage supplied to them, and they start to operate. After the starting phase of the fuel cell 1, the no-load voltage of, for example, 450 V is produced at the outputs of the fuel cell 1, when the contacts 4, 5, 20 are open. Components on the high-voltage side of the assembly 14 then start to operate. As a result, for example, the no-load voltage and the isolation resistance are measured. The A/D converter 40 has a multiplexer (not shown) integrated in it, by means of which the various signals and measured values of the current, voltage and resistance are supplied in serial form to the microprocessor 30.

If no alarms, such as response of the gas sensors, a critical value of the no-load voltage, a critical value of the isolation resistance or some other critical value produced by a sensor, are detected by the microprocessor 30 and/or by the logic circuit 26 after the fuel cell has been started, the contacts 4 and 20 are closed, causing the output voltage of the fuel cell and the voltage (for example, 200 V) which is produced in the electrically isolated network from the DC/DC converter that is fed from the rechargeable battery, to be matched to one another. The demand to connect the contacts can be supplied from a higher-level controller (not shown) on the CAN bus to the logic circuit 26, which then causes the contacts 4 and 20 to operate. Once the contacts 20 have been connected, the contact 5 is also closed. The equalization of the potentials on the contact poles of the contact 5 largely avoids sparks, so that the contacts are protected even if switching takes place frequently.

The detection of a short-circuit current in the fuel cell network is signalled to the processor 30 and, via the input 36 of the logic circuit, causes immediate tripping (that is, opening), of the contacts 4, 5 and 20.

The monitoring measures described above, together with the separation of the assembly 14 into a low-voltage section 24 and a high-voltage section 25, achieve a high level of safety on their own. The device 42 for measuring the isolation resistance is stimulated or controlled from the processor 30 via an optocoupler interface (not shown in any more detail). This also applies to the A/D converter 40 and to the current sensor 38.

The following measures are also provided, in order to achieve the greatest possible level of safety:

The processor 30 is monitored, together with the software, by a watchdog module. This means that a processor module defect or a software crash leads to the switch connections or contacts 4, 5 and 20 being disconnected.

Direct operation, the CAN bus connection is checked continuously and faults are identified and signalled, causing the switching contacts 4, 5 and 20 to be opened.

Supply voltages to the electronics are read and are monitored against their defined limits, in order to prevent the switching contacts 4, 5, 20 from being closed during starting of the vehicle, or a defect being caused during operation of the vehicle, due to the vehicle power supply network voltage being too low. Depending on the magnitude of the discrepancy from the defined limit value, various measures can be taken, such as signalling and/or stopping units in the vehicle, or disconnection of the switching contacts 4, 5 and 20.

All the inputs and outputs of the assembly 14 are resistant to short circuits to the vehicle ground and of the 12 V vehicle voltage, which can be detected as faults in the event of short circuits that are signalled and, in addition to the signalling, lead to opening of the switching or contacts 4, 5 and 20 in the event of short circuits which unacceptably adversely affect the safety of operation and of the vehicle.

The fuel cell voltage is monitored for faults by defining lower and upper limits. In the same way as the isolation resistance monitoring, thresholds are defined for an excessively low isolation resistance, with an appropriate alarm action, and a threshold is defined for an excessively high isolation resistance, which, if exceeded, is identified as an interruption. Since the measurement time for the isolation measurement is relatively long, a quick measurement is provided for each new starting process (when the supply voltage is switched on), but with somewhat reduced accuracy. The monitoring of the fuel cell current is subject to the most stringent safety precautions. Initially, the lower and upper current limits are monitored by means of software. If the upper limit is exceeded (short circuit), a quick hardware disconnection is carried out, in a redundant manner, for the two switching contacts 4, 5 and the contact 20. In order that a circuit defect in the current measurement can also be identified, a test current is fed, and is monitored continuously, via an additional test winding in the current sensor.

A redundant hardware circuit is also used for software monitoring, in order to monitor the hydrogen concentration.

The control and evaluation unit according to the invention in the contact assembly 14 makes it possible in an economic and safe manner to monitor the fuel cell, the fuel cell network and the isolation resistance of this network. In the event of any danger, the connection between the fuel cell and the network is opened. The assembly 14 can be tested before being installed in a vehicle, so that there is no need for any time-consuming testing after installation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method, for controlling a switching connection between i) electrical outputs of a fuel cell of a power supply system in a device, and ii) an isolated electrical network which supplies load elements with power from the fuel cell, wherein, the power supply system includes a further network whose voltage is lower than voltages of the isolated network, and of a storage battery connected to the isolated network;

the switching connection has at least one switching contact of a switching member connected to each output of the fuel cell for connecting and disconnecting the electrically isolated network to and from the outputs of the fuel cell, which outputs are electrically isolated from conductive parts of the device; and the contacts which are connected to the outputs are part of a first switching member or members connected to a switching and control unit, which is supplied with power from the further network, said method comprising:

sensors generating sensor signals indicative of an occurrence of apparatus states for which supply of power from the fuel cell to the electrically isolated network must be precluded or interrupted for safety reasons;

the switching and control unit monitoring the sensors;

during starting of the fuel cell, the switching and control unit releasing energy for closing contacts when the fuel cell has reached operational readiness, provided that the switching and control unit has not detected any sensor signal for precluding or interrupting closure of the contacts of the first switching member or members for safety reasons; and upon detection of at least one sensor signal for precluding or interrupting closure of contacts, the control and evaluation unit blocking or interrupting power supply from the fuel cell to the first switching member or members, a series circuit formed by a resistor and a contact of a further switching member, which is connected to the switching and control unit and can be operated separately from the other switching members, is connected in parallel with one of contacts which are connected to the outputs or poles of the fuel cell;

energy for closing the contact is supplied to the further switching member at the same time as the energy for closing the contact of the first switching member or members after starting of the fuel cell and after it has reached operational readiness; and if the switching and control unit detects a sensor signal for precluding or interrupting closure of the contacts of the switching members, the power for operating the further switching member and the first switching member or members is blocked or interrupted.

2. A method, for controlling a switching connection between i) electrical outputs of a fuel cell of a power supply system in a device, and ii) an isolated electrical network which supplies load elements with power from the fuel cell, wherein, the power supply system includes a further network whose voltage is lower than voltages of the isolated network, and of a storage battery connected to the isolated network;

the switching connection has at least one switching contact of a switching member connected to each output of the fuel cell for connecting and disconnecting the electrically isolated network to and from the outputs of the fuel cell, which outputs are electrically isolated from conductive parts of the device; and the contacts which are connected to the outputs are part of a first switching member or members connected to a switching and control unit, which is supplied with power from the further network, said method comprising:

sensors generating sensor signals indicative of an occurrence of apparatus states for which supply of power from the fuel cell to the electrically isolated network must be precluded or interrupted for safety reasons;

the switching and control unit monitoring the sensors;

during starting of the fuel cell, via the switching and control unit releasing energy for closing contacts when the fuel cell has reached operational readiness, provided that the switching and control unit has not detected any sensor signal for precluding or interrupting closure of the contacts of the first switching member or members for safety reasons; and upon detection of at least one sensor signal for precluding or interrupting closure of contacts, the control and evaluation unit blocking or interrupting power supply from the fuel cell to the first switching member or members;

emergence of hydrogen from the hydrogen-producing or hydrogen-storing units is monitored by means of gas sensors;

a sensor connected downstream of the fuel cell monitors whether load current from the fuel cell has overshot or undershot limit values;

the device comprises a mobile apparatus;

at least one crash sensor monitors whether the mobile apparatus has impacted with an obstruction;

an isolation resistance of the electrically isolated network from the apparatus ground is monitored;

output voltage of the fuel cell is monitored to determine whether limit values are overshot or undershot;

a closure state of doors and covers of said apparatus is monitored by switches;

supply voltage of the further network is monitored for limit values being overshot and undershot; and presence of conditions for opening of the make contacts of the switching members is checked.

3. The method according to claim 2, wherein:
the isolation resistance is determined by means of a pulse measurement method, with positive and negative pulses being passed to ground alternately via a measurement resistor of predetermined magnitude; and
the pulses cause a current to flow via the isolation resistance to a reference point in the network, which current is measured by means of a voltage drop across the measurement resistor.

4. The method according to claim 2, wherein a current sensor is monitored for correct operation by feeding a test current into an additional winding of a current transformer.

5. The method according to claim 2, wherein
when at least one of the gas sensors responds, the contacts of the switching connection between the outputs or poles of the fuel cell and the electrically isolated network, and at least one contact of the further switching member in a further network, are opened in order to interrupt the power supply at least to the switching and control unit.

6. The method according to claim 1, wherein:
the further switching member is a separately operable relay; and
the first switching member or members are circuit breakers or switch disconnectors.

7. Apparatus for controlling a switching connection between i) the electrical outputs of a fuel cell of a power supply system in a device, and ii) an isolated electrical network which supplies load elements with power from the fuel cell, the power supply system including a further network whose voltage is lower than voltages of the isolated network, and of a storage battery connected to the isolated network, said apparatus comprising:
at least two primary switching contacts for connecting respective outputs of the fuel cell to the isolated network; and
an assembly which has a control and evaluation unit including a processor that is connected to an internal bus apparatus, a logic circuit with logic functions in the form of hardware, an A/D converter coupled to the processor in a DC-isolating manner for converting measured analog fuel cell current, measured analog fuel cell voltage and analog voltage of a measurement resistor for checking isolation of the isolated network, a power supply unit that is fed from the further network, with DC isolation for supplying an operating voltage to the A/D convertor, at least first and second control modules connected to an output of the logic circuit, and voltage matching converters connected to the processor and to the logic circuit for supplying voltage to gas sensors, and for matching signals which are emitted from the gas sensors to the levels of the logic circuit and of the processor; wherein
the logic circuit, the processor, the voltage matching converters and the control modules are supplied with an operating voltage from the further network;
at least one output of the processor is connected to a corresponding input of the logic circuit, which logic circuit is connected to sensors for producing signals relating to states of the apparatus or its parts;
enabling of output signals from the control modules can be controlled by the logic circuit, which logic circuit is i) controlled by a higher-level appliance, and ii) connected to respective coils of a first switching member which has one of the at least two primary contacts, and of a second switching member which an has another of the at least two primary contacts; and
in response to current, voltage or isolation resistance measured values detected by the processor, or sensor measured values detected by the logic circuit, for which supply to the electrically isolated network must be precluded or stopped for safety reasons, output of output signals from the control modules to the coils is blocked or interrupted.

8. Arrangement according to claim 7, wherein:
a further switching contact of a third switching member is arranged in series with a resistor, in parallel with the primary contact of one of the second or first switching members; and
the third switching member is connected to a driver module, which is supplied with an operating voltage from the further network on the assembly, which driver module is connected to the logic circuit such that, in a start phase after the fuel cell has reached operational readiness but before the emission of a control signal to the first control module, which operates the second or first switching member, the logic circuit causes a control signal to be applied to a first driver module in order to emit an operating signal to the third switching member concurrently with emission of a control signal for operating the first or second switching member, and blocks emission of control signals to operate the three switching members, disconnecting the outputs of the fuel cell from the electrically isolated network.

9. The arrangement according to claim 8, wherein a further driver module on the assembly is connected to an output of the logic circuit and can control a system relay, which can be disconnected at the same time as the switching members to interrupt the current supply from the further network, at least for the assembly, when at least one gas sensor responds.

10. The arrangement according to claim 7, wherein:
the assembly has a printed circuit board with a first section which is fitted with first components that are supplied with an operating voltage directly from the further network and is separated from a further section of the printed circuit board, which is fitted with second components to which the voltage of the fuel cell of the network of the fuel cell is applied.

11. The arrangement according to claim 10, wherein:
said first components include at least the logic circuit, the processor, the voltage matching converters and control and driver modules with associated conductor tracks and the connections for the coils of the switching members, as well as the connections of sensors that are connected to the further network, of bus conductors and of an earth connection; and
said second components include a current sensor, a voltage divider for measuring the voltage of the outputs of the fuel cell, an A/D converter for conversion of measured analog current and voltage values, and a device for isolation measurement.

12. The arrangement according to claim 7, wherein a negative side of fuel cell voltage forms a reference potential for the second components on the assembly, and is connected to one connection of the further section of the printed circuit board.

13. The arrangement according to claim 7, wherein the current sensor has a current transformer with a conductor which passes through both the printed circuit board and a current transformer core arranged on the printed circuit board, without touching them.

14. The arrangement according to claim 10, wherein:
a measurement resistor is arranged in the second section on the printed circuit board for measuring isolation resistance of the isolated electrical network from the ground of the mobile device;

the measurement resistor is connected to receive positive and negative voltage pulses applied to it; and the measurement resistor is connected to the A/D converter via a high-pass filter and a low-pass filter.

15. The arrangement according to claim 7, wherein the processor and software in the processor are monitored by means of a watchdog module, which produces a signal or controls disconnection of the respective contacts via the logic circuit, if a fault is found.

16. The arrangement according to claim 7, wherein:

supply voltage of the further network is monitored against predetermined limit values by means of an output to the processor; and if the limit values are exceeded, at least one of a signal and opening of the respective contacts results.

17. The arrangement according to claim 10, wherein inputs and outputs of components arrangement on the printed circuit board, including the logic circuit, the processor, the driver stages, the control circuits and the converters, are designed to be resistant to short circuits.

18. The arrangement according to claim 7, wherein operation of the bus is checked periodically by the processor.

19. The arrangement according to claim 7, wherein:

fuel cell current is monitored by the processor for overshooting and undershooting of predetermined limit values; and if the limit values are overshot or undershot, one of a signal and opening of the respective contacts results.

20. The arrangement according to claim 7, wherein:

the fuel cell voltage is monitored by the processor for overshooting and undershooting of predetermined limit values; and if the limit values are overshot or undershot, one of a signal and opening of the respective contacts results.

21. The apparatus according to claim 7, wherein the isolation resistance is monitored by means of the processor for undershooting of a limit which, if undershot, results in the respective contacts being opened.

22. The arrangement according to claim 7, wherein software in the processor trims a zero point and amplifies measured values of current, voltage and isolation resistance.

23. The arrangement according to claim 7, wherein switching states of the switching members are monitored by means of auxiliary contacts, which are connected to the processor.

24. The arrangement according to claim 7, wherein:

each of the first and the second switching members is a switch disconnector or circuit breaker; and the further switching member is a relay.

25. The arrangement according to claim 23, wherein each of the first and second switching members is a contactor.

* * * * *